US008011749B2

(12) United States Patent
Kim et al.

(10) Patent No.: US 8,011,749 B2
(45) Date of Patent: Sep. 6, 2011

(54) APPARATUS AND METHOD FOR MEASURING THICKNESS OF INK LAYER IN PIXEL

(75) Inventors: Sang-il Kim, Suwon-si (KR); Tae-gyun Kim, Suwon-si (KR); Tae-woon Cha, Seoul (KR); Sang-kwon Wee, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 771 days.

(21) Appl. No.: 12/123,713

(22) Filed: May 20, 2008

(65) Prior Publication Data

US 2009/0174742 A1 Jul. 9, 2009

(30) Foreign Application Priority Data

Jan. 9, 2008 (KR) ........................ 10-2008-0002641

(51) Int. Cl.
*B41J 29/38* (2006.01)
*B41J 29/393* (2006.01)
*G01F 23/00* (2006.01)

(52) U.S. Cl. ........................... 347/14; 347/19; 73/304 C

(58) Field of Classification Search ........................ None
See application file for complete search history.

(56) References Cited

U.S. PATENT DOCUMENTS

| | | | | |
|---|---|---|---|---|
| 5,682,184 | A * | 10/1997 | Stephany et al. | 347/7 |
| 7,705,997 | B2 * | 4/2010 | Sakai et al. | 356/511 |
| 2007/0188537 | A1 * | 8/2007 | Kim et al. | 347/19 |
| 2009/0184990 | A1 * | 7/2009 | Shang et al. | 347/6 |

* cited by examiner

*Primary Examiner* — Omar Rojas
(74) *Attorney, Agent, or Firm* — Stanzione & Kim, LLP

(57) ABSTRACT

Provided are an apparatus and method for measuring the thickness of an ink layer in a pixel and a method of controlling nozzles of an inkjet head using the apparatus and method. The apparatus includes: a substrate; a plurality of pixels disposed on the substrate and filled with ink due to a printing operation; first and second electrodes corresponding to the pixels, the first and second electrodes disposed on opposite sides of each of the pixels; and a capacitance measurement circuit electrically connected to the first and second electrodes to measure the capacitance of each of the pixels.

11 Claims, 5 Drawing Sheets

APPARATUS AND METHOD FOR MEASURING THICKNESS OF INK LAYER IN PIXEL

CROSS-REFERENCE TO RELATED APPLICATIONS

This application claims the benefit of Korean Patent Application No. 10-2008-0002641, filed on Jan. 9, 2008, in the Korean Intellectual Property Office, the disclosure of which is incorporated herein in its entirety by reference.

BACKGROUND OF THE INVENTION

1. Field of the Invention

The present invention relates to an apparatus and method for measuring the thickness of an ink layer in a pixel, and more particularly, to an apparatus and method for measuring the thickness of an ink layer, which is filled in a pixel due to a printing operation, in real-time, and a method of controlling respective nozzles of an inkjet head using the same apparatus and method.

2. Description of the Related Art

An inkjet head is an apparatus that ejects very small ink droplets on a printing medium in a desired position via nozzles to form an image. The inkjet head has lately been applied to more various electronic devices, such as liquid crystal display devices (LCDs), organic light emitting display devices (OLEDs), and organic thin film transistors (OTFTs).

FIG. 1 is a diagram for explaining a method of manufacturing a color filter of an LCD using an inkjet head 50.

Referring to FIG. 1, ink droplets 60 in a predetermined color are ejected via nozzles 55 of the inkjet head 50 and filled in pixels 22 disposed on a substrate 10. Thereafter, ink is dried to form a solid ink layer 65 in the pixels 22 to a predetermined thickness. A black matrix 20 is formed on the substrate 20 and defines the pixels 22. In the manufacture of the color filter, the nozzles 55 of the inkjet head 50 may have different ejection characteristics so that different amount of ink droplets 60 may be ejected through the nozzles 55. When the nozzles 55 allow different amount of ink droplets 60 to pass therethrough, ink layers 65 are formed to different thicknesses in the pixels 22 as shown in FIG. 2, thereby greatly deteriorating the color characteristics of the LCD.

In order to uniformize the thicknesses of ink layers, the same amount of ink should be ejected via all nozzles of an inkjet head during a printing operation. Accordingly, it is necessary to control waveforms of voltages applied to the nozzles of the inkjet head. Thus, various methods have been proposed to control the nozzles of the inkjet head. For example, the mass of ink droplets ejected via a nozzle may be measured using a scale, such as a load cell. Alternatively, the volume of ink droplets ejected via the nozzle may be measured using a camera. In another method, after ink droplets ejected via a nozzle are filled in a pixel and dried, the thickness of an ink layer formed in the pixel may be measured. However, a method of measuring the mass of the ink droplets using the scale results in large measurement errors and takes much time. Also, measuring the volume of the ink droplets is difficult when the ink droplets have irregular shapes. Furthermore, since a method of measuring the thickness of the ink layer filled in the pixel involves a drying process, it takes much time to measure the thickness of the ink layer.

SUMMARY OF THE INVENTION

The present invention provides an apparatus and method for measuring the thickness of an ink layer, which is filled in a pixel, in real-time.

Also, the present invention provides a method of controlling nozzles of an inkjet head using the above-described apparatus and method.

According to an aspect of the present invention, there is provided an apparatus for measuring a thickness of an ink layer. The apparatus includes: a substrate; a plurality of pixels disposed on the substrate and filled with ink due to a printing operation; first and second electrodes corresponding to each of the pixels, the first and second electrodes disposed on opposite sides of each of the pixels; and a capacitance measurement circuit electrically connected to the first and second electrodes to measure the capacitance of each of the pixels.

The printing operation may be performed using an inkjet technique, and the pixels may correspond respectively to nozzles of the inkjet head.

The thickness of an ink layer formed in each of the pixels may be obtained by measuring the capacitance of the corresponding pixel.

The apparatus may further include a material layer disposed on the substrate to define the pixels.

According to another aspect of the present invention, there is provided a method of measuring a thickness of an ink layer using the above-described apparatus. The method includes: measuring an initial capacitance of each of the pixels when the pixels are not filled with ink; filling the pixels with the ink due to the printing operation; measuring the capacitance of each of the pixels using the capacitance measurement circuit; and calculating the thickness of an ink layer filled in each of the pixels.

The thickness of the ink layer may be calculated using a variation in the capacitance of the corresponding pixel, which is obtained by comparing the initial capacitance of the pixel with the capacitance of the pixel filled with the ink.

According to yet another aspect of the present invention, there is provided a method of controlling nozzles of an inkjet head using the above-described apparatus and method for measuring the thickness of an ink layer in a pixel. The method of controlling the nozzles of the inkjet head includes: measuring an initial capacitance of each of the pixels when the pixels are not filled with the ink; filing the pixels corresponding to the nozzles with the ink by applying voltages having preset waveforms to the respective nozzles of the inkjet head; measuring the capacitances of the pixels using the capacitance measurement circuit; calculating the thickness of an ink layer filled in each of the pixels; and setting waveforms of voltages corresponding to target thicknesses of ink layers to be formed in the nozzles of the inkjet head.

After setting the waveforms of the voltages, the method may further include repeating an operation of measuring the initial capacitance of each of the pixels through an operation of setting the waveforms of the voltages at least once.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Figure 1:
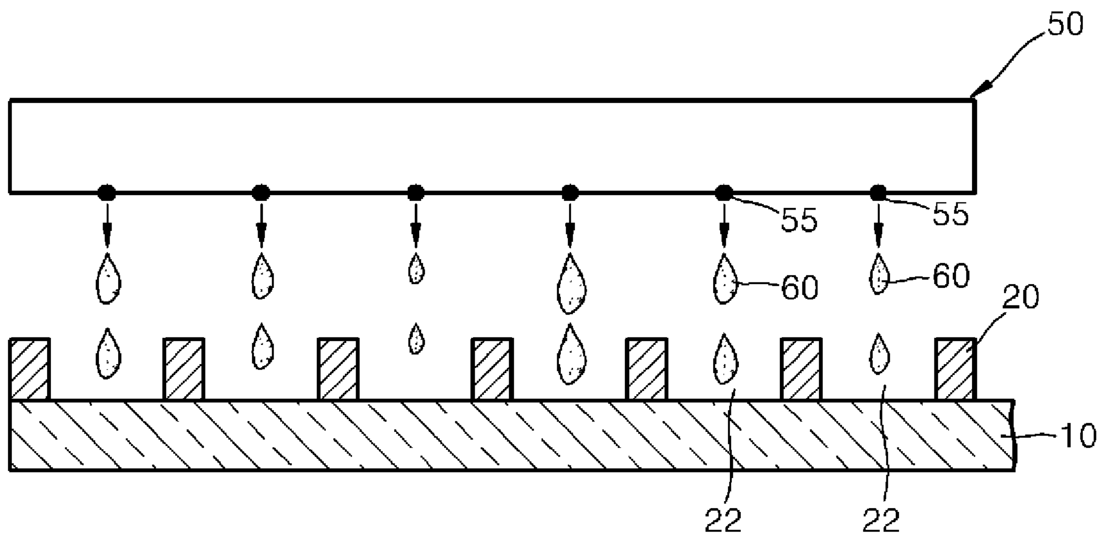
FIG. 1 (PRIOR ART)
FIG. 1 is a diagram for explaining a method of manufacturing a color filter of a liquid crystal display device (LCD) using an inkjet head.
Figure 2:
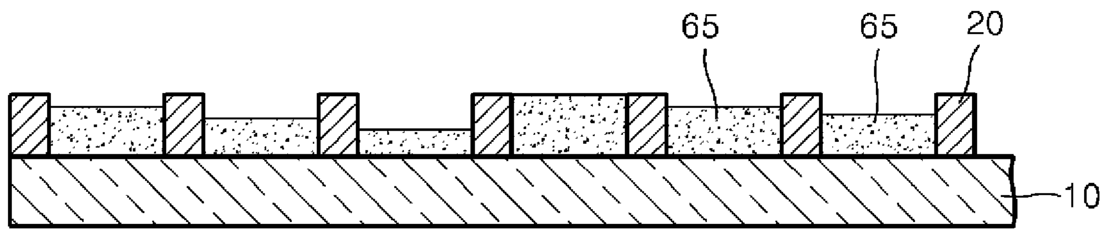
FIG. 2 (PRIOR ART)
FIG. 2 is a cross-sectional view of ink layers formed in pixels to different thicknesses.

The present invention will be described more fully hereinafter with reference to the accompanying drawings, in which exemplary embodiments of the invention are shown. The same reference numerals are used to denote the same elements throughout the specification. In the drawings, the thicknesses of layers and regions are exaggerated for clarity.

Figure 3:
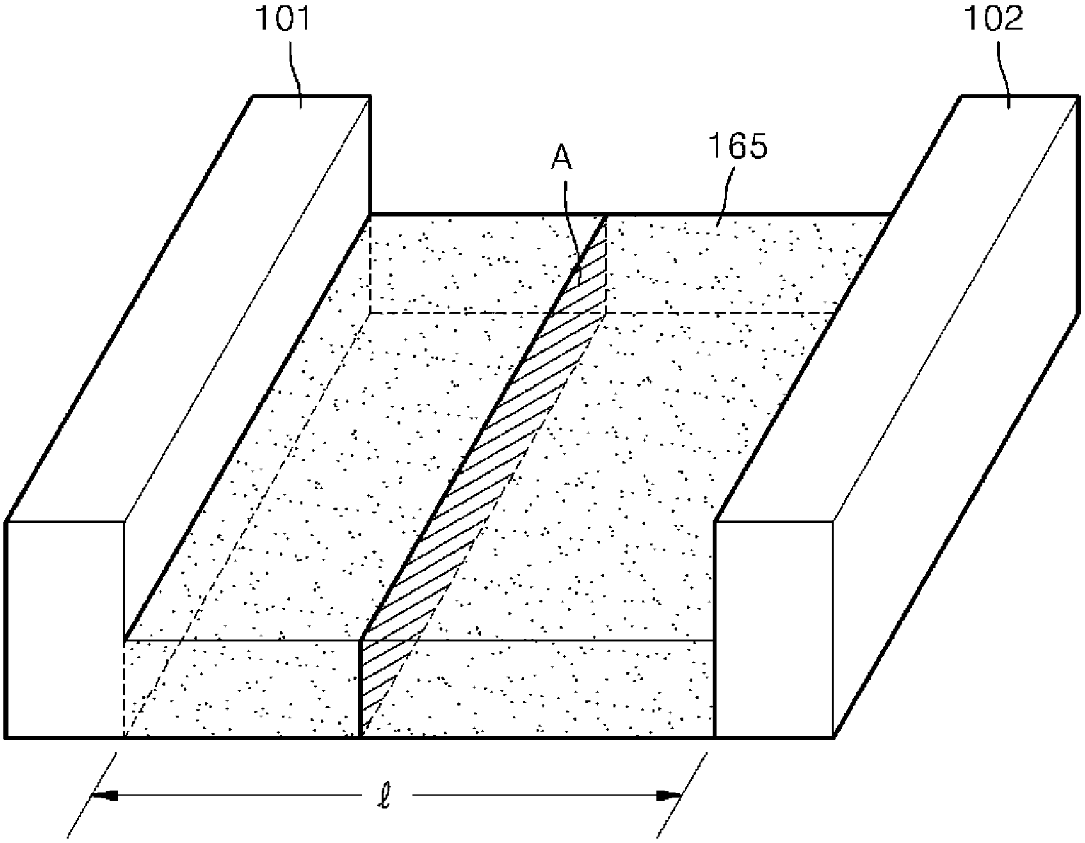
FIG. 3 is a diagram of the capacitance of a pixel relative to the amount of ink filled in a pixel formed between two electrodes.

According to the present invention, the thickness of an ink layer filled in a pixel is determined by measuring the capacitance of the pixel. FIG. 3 is a diagram of the capacitance of a pixel relative to the amount of ink filled in a pixel formed between two electrodes.

Referring to FIG. 3, an ink layer 165 is formed to a predetermined thickness in a pixel, and first and second electrodes 101 and 102 are respectively formed on both sides of the pixel. The first and second electrodes 101 and 102 are probes for measuring the capacitance of the pixel and formed of a conductor. In this case, the capacitance of the pixel varies with the thickness of the ink layer 165 filled in the pixel. Specifically, the capacitance of the pixel is inversely proportional to a length "l" of the pixel and proportional to a sectional area A of the ink layer 165. The sectional area A of the ink layer 165 is the product of the width of the pixel and the thickness of the ink layer 165. Thus, as the thickness of the ink layer 165 increases, the capacitance of the pixel increases. In the present invention, by measuring a variation in the capacitance of the pixel on the above-described principles, a variation in the thickness of the ink layer 165 filled in the pixel can be measured in real-time.

Figure 4:
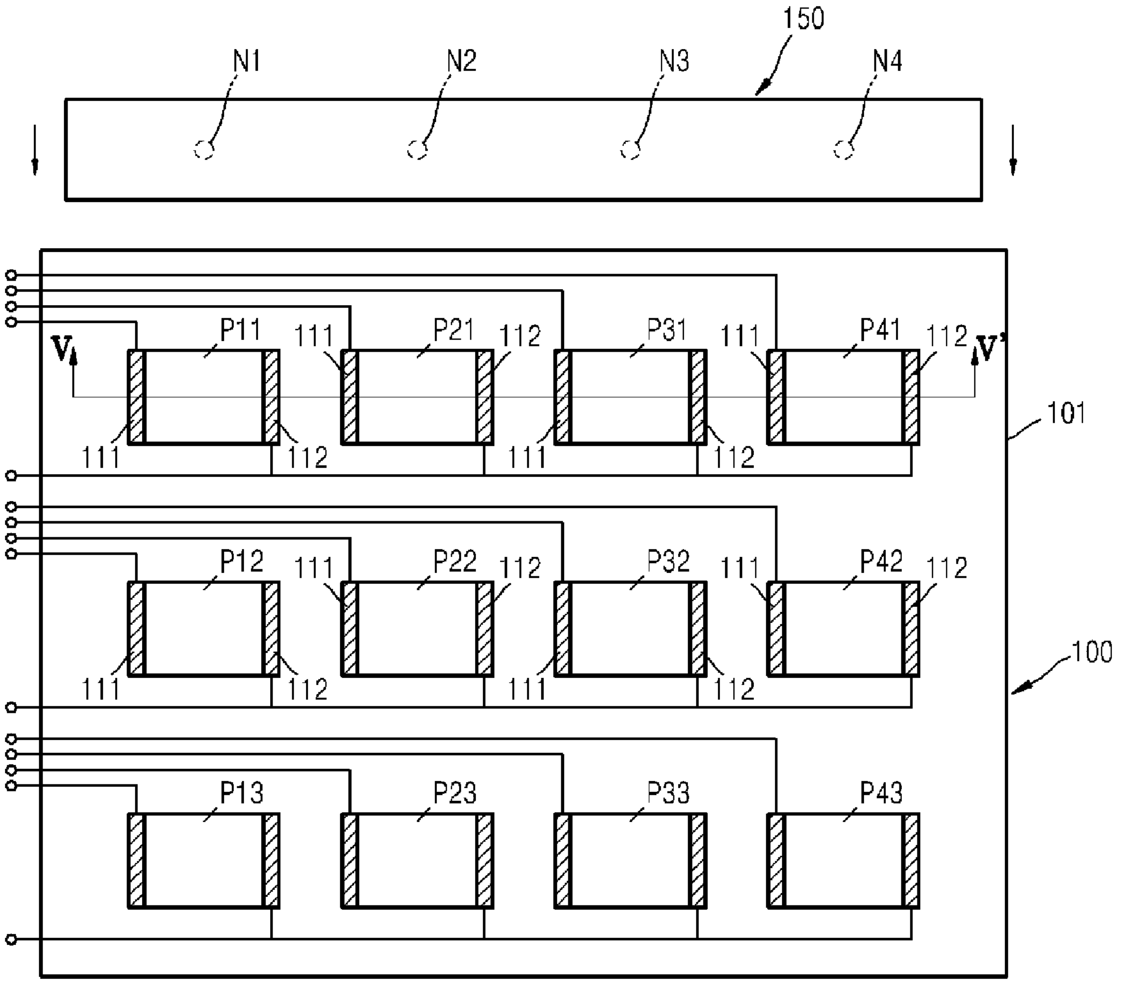
FIG. 4 is a plan view of an apparatus for measuring the thickness of an ink layer according to an embodiment of the present invention.
Figure 5:
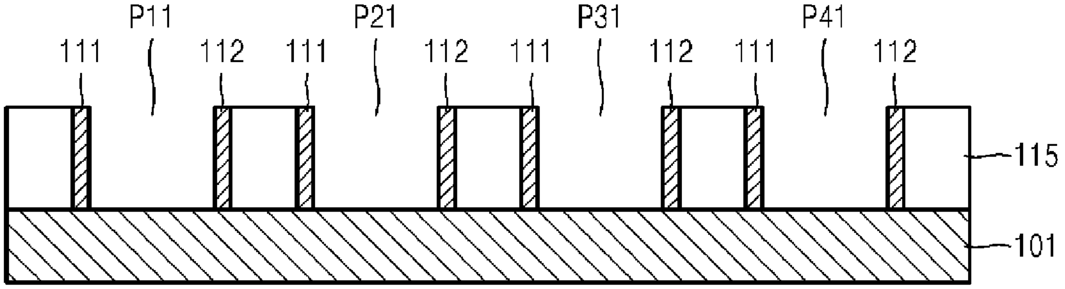
FIG. 5 is a cross-sectional view taken along a line V-V' of FIG. 4.

FIG. 4 is a plan view of an apparatus 100 for measuring the thickness of an ink layer according to an embodiment of the present invention, and FIG. 5 is a cross-sectional view taken along a line V-V' of FIG. 4.

Referring to FIGS. 4 and 5, the apparatus 100 according to the present embodiment includes a substrate 101, a plurality of pixels P11, P12, P13, P21, P22, P23, P31, P32, P33, P41, P42, and P43, and first and second electrodes 111 and 112 disposed to correspond to each of the pixels P11, P12, P13, P21, P22, P23, P31, P32, P33, P41, P42, and P43. In FIG. 5, a material 115 is disposed on the substrate 101 and defines the plurality of pixels P11, P12, P13, P21, P22, P23, P31, P32, P33, P41, P42, and P43. For example, the material layer 115 may correspond to a black matrix for color filters.

The pixels P11, P12, P13, P21, P22, P23, P31, P32, P33, P41, P42, and P43 are filled with ink due to a printing operation. Although FIG. 4 illustrates a case where pixels are arranged in three rows and four columns on the substrate 101, the present invention is not limited thereto and the number and arrangement of pixels may be variously changed. Also, FIG. 4 illustrates a case where each of the pixels P11, P12, P13, P21, P22, P23, P31, P32, P33, P41, P42, and P43 has a rectangular shape, but each of the pixels P11, P12, P13, P21, P22, P23, P31, P32, P33, P41, P42, and P43 may have other various shapes. The printing operation may be performed using an inkjet technique, but the present invention is not limited thereto. FIG. 4 illustrates an inkjet head 150 for printing the pixels P11, P12, P13, P21, P22, P23, P31, P32, P33, P41, P42, and P43. In FIG. 4, the inkjet head 150 includes nozzles N1, N2, N3, and N4. Also, pixels P11, P12, and P13 correspond to the nozzle N1, and pixels P21, P22, and P23 correspond to the nozzle N2. Also, pixels P31, P32, and P33 correspond to the nozzle N3, and pixels P41, P42, and P43 correspond to the nozzle N4.

In the inkjet head 150, predetermined ink droplets are ejected via the nozzles N1, N2, N3, and N4 in the arrow direction so that an ink layer is formed to a predetermined thickness in the pixels P11, P12, P13, P21, P22, P23, P31, P32, P33, P41, P42, and P43 on the substrate 101. The first and second electrodes 111 and 112 are probes for measuring the capacitances of the pixels P11, P12, P13, P21, P22, P23, P31, P32, P33, P41, P42, and P43. The first and second electrodes 111 and 112 are disposed on opposite sides of each of the pixels P11, P12, P13, P21, P22, P23, P31, P32, P33, P41, P42, and P43. The first and second electrodes 111 and 112 may be formed of a conductor. Also, a capacitance measurement circuit (not shown) is electrically connected to the first and second electrodes 111 and 112 and measures the capacitances of the pixels P11, P12, P13, P21, P22, P23, P31, P32, P33, P41, P42, and P43. In the above-described structure, while moving the inkjet head 150, a predetermined number of ink droplets are ejected via each of the nozzles N1, N2, N3, and N4 and filled in each of the pixels P11, P12, P13, P21, P22, P23, P31, P32, P33, P41, P42, and P43 on the substrate 101, thereby forming ink layers to predetermined thicknesses. Thereafter, when the ink layers are formed in the pixels P11, P12, P13, P21, P22, P23, P31, P32, P33, P41, P42, and P43, the capacitance of each of the pixels P11, P12, P13, P21, P22, P23, P31, P32, P33, P41, P42, and P43 is measured using the capacitance measurement circuit to thereby measure the thicknesses of the ink layers filled in the respective pixels P11, P12, P13, P21, P22, P23, P31, P32, P33, P41, P42, and P43.

Figure 7:
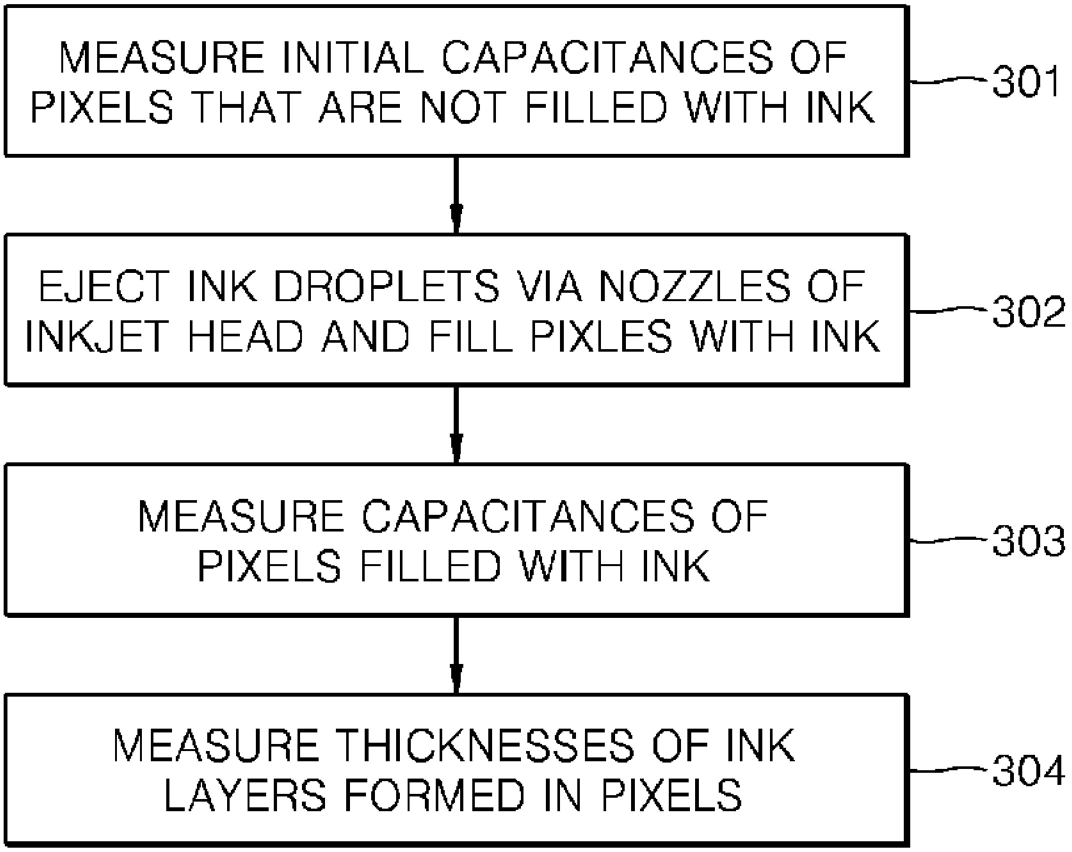
FIG. 7 is a flowchart of a method of measuring the thickness of an ink layer according to yet another embodiment of the present invention.

Hereinafter, a method of measuring the thickness of the ink layer filled in each of the pixels P11, P12, P13, P21, P22, P23, P31, P32, P33, P41, P42, and P43 using the apparatus 100 shown in FIGS. 4 and 5 will be described in detail with reference to FIG. 7. FIG. 7 is a flowchart of a method of measuring the thickness of an ink layer according to yet another embodiment of the present invention.

Referring to FIGS. 4, 5, and 7, initially, before a printing operation is performed, that is, when the pixels P11, P12, P13, P21, P22, P23, P31, P32, P33, P41, P42, and P43 are not filled with ink, an initial capacitance of each of the pixels P11, P12, P13, P21, P22, P23, P31, P32, P33, P41, P42, and P43 is measured in operation 301. Thereafter, the printing operation is performed using the inkjet head 150, thereby forming ink layers to predetermined thicknesses in the pixels P11, P12, P13, P21, P22, P23, P31, P32, P33, P41, P42, and P43 in operation 302. Specifically, a voltage with a predetermined waveform is applied to each of the nozzles N1, N2, N3, and N4 of the inkjet head 150. While the inkjet head 150 moves in a predetermined direction (in the arrow direction of FIG. 4), ink droplets are ejected via the respective nozzles N1, N2, N3, and N4 and filled in the pixels P11, P12, P13, P21, P22, P23, P31, P32, P33, P41, P42, and P43, thereby forming ink layers to predetermined thicknesses. After the ink layers are formed, the capacitance of each of the pixels P11, P12, P13, P21, P22, P23, P31, P32, P33, P41, P42, and P43 is measured in operation 303. Subsequently, the initial capacitance of each of the pixels P11, P12, P13, P21, P22, P23, P31, P32, P33, P41, P42, and P43 is compared with the capacitance of each of the pixels P11, P12, P13, P21, P22, P23, P31, P32, P33, P41, P42, and P43 that are filled with the ink to measure a variation in the capacitance of each of the pixels P11, P12, P13, P21, P22, P23, P31, P32, P33, P41, P42, and P43. Thus, the thickness of the ink layer filled in each of the pixels P11, P12, P13, P21, P22, P23, P31, P32, P33, P41, P42, and P43 is calculated in operation 304. As a result, the amount of ink ejected via each of the nozzles N1, N2, N3, and N4 can be measured. Specifically, when the thickness of the ink layer formed in the pixel P11, P12, or P13 is measured, the amount of ink ejected via the nozzle N1 may be measured, and when the thickness of the ink layer formed in the pixel P21, P22, or P23 is measured, the amount of ink ejected via the nozzle N2 may be measured. Also, when the thickness of the ink layer formed in the pixel P31, P32, or P33 is measured, the amount of ink ejected via the nozzle N3 may be measured, and when the thickness of the ink layer formed in the pixel P41, P42, or P43 is measured, the amount of ink ejected via the nozzle N4 may be measured. Meanwhile, when the ink layers formed in the pixels P11, P12, and P13 have different thicknesses, the amount of ink ejected via the nozzle N1 may be measured based on the average of the thicknesses of the ink layers formed in the pixels P11, P12, and P13.

Based on the thicknesses of the ink layers measured using the above-described method, the nozzles N1, N2, N3, and N4 of the inkjet head 150 may be controlled such that the same amount of ink is ejected via the respective nozzles N1, N2, N3, and N4 of the inkjet head 150. Hereinafter, a method of controlling the respective nozzles N1, N2, N3, and N4 of the inkjet head 150 will be described.

Initially, as described above, the thickness of the ink layers corresponding to each of the nozzles N1, N2, N3, and N4 of the inkjet head 150 is determined by measuring the thicknesses of the ink layers formed in the respective pixels P11, P12, P13, P21, P22, P23, P31, P32, P33, P41, P42, and P43. Next, the determined thickness of the ink layer is compared with a target thickness of the ink layer so that a voltage waveform corresponding to the target thickness of the ink layer is set for each of the nozzles N1, N2, N3, and N4 of the inkjet head 150. Also, when a voltage with the set waveform is applied to each of the nozzles N1, N2, N3, and N4 of the inkjet head 150, the same amount of ink can be ejected via the respective nozzles N1, N2, N3, and N4. Meanwhile, when the foregoing operation steps are repeated at least once, the nozzles N1, N2, N3, and N4 of the inkjet head 150 may be controlled more exactly. That is, voltages with newly set waveforms are respectively applied to the nozzles N1, N2, N3, and N4, the thicknesses of ink layers formed in the pixels P11, P12, P13, P21, P22, P23, P31, P32, P33, P41, P42, and P43 are measured, and voltage waveforms are reset based on measurement results so that the nozzles N1, N2, N3, and N4 of the inkjet head 150 can be controlled more exactly.

Figure 6:
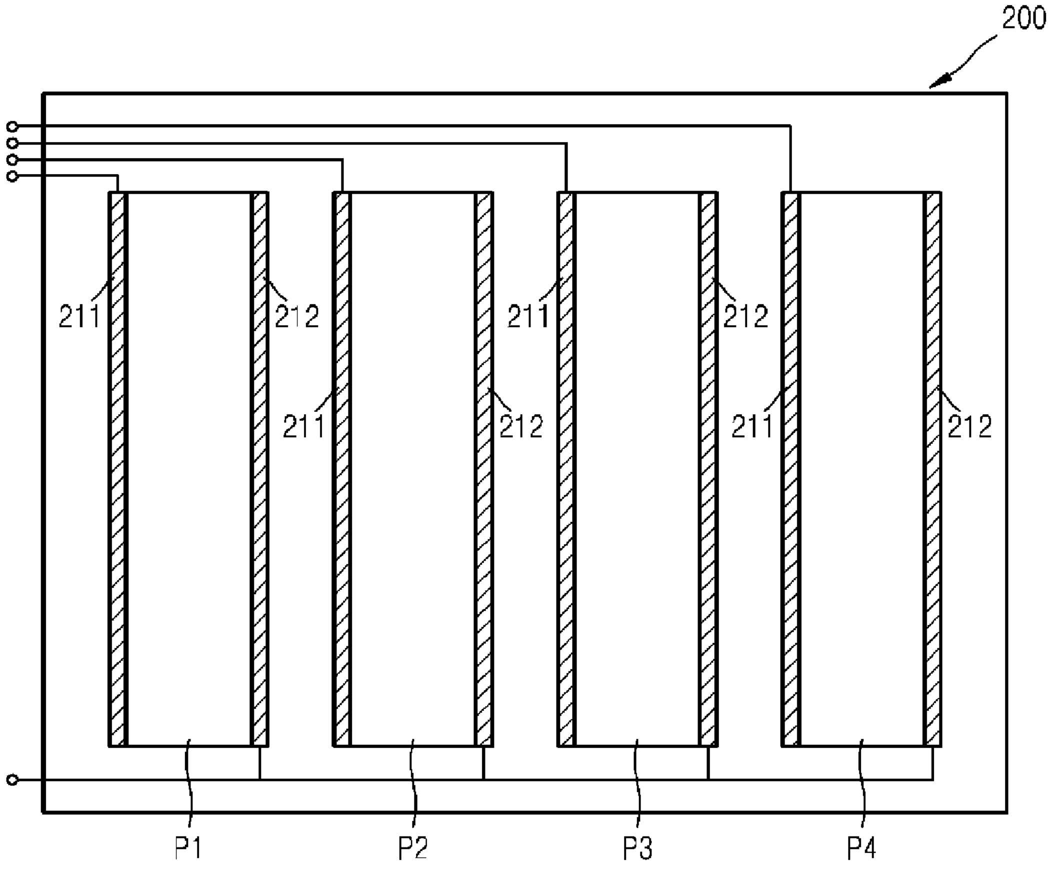
FIG. 6 is a plan view of an apparatus for measuring the thickness of an ink layer according to another embodiment of the present invention.

FIG. 6 is a plan view of an apparatus 200 for measuring the thickness of an ink layer according to another embodiment of the present invention. Hereinafter, only differences between the apparatus 100 shown in FIGS. 4 and 5 and the apparatus 200 shown in FIG. 6 will be described.

Referring to FIG. 6, in the apparatus 200, a plurality of pixels P11, P12, P13, P21, P22, P23, P31, P32, P33, P41, P42, and P43 shown in FIG. 4, which correspond to the nozzles N1, N2, N3, and N4, combine into four pixels P1, P2, P3, and P4. For example, the pixels P11, P12, and P13 of FIG. 4, which correspond to the nozzle N1, combine into the pixel P1, and the pixels P21, P22, and P23 of FIG. 4, which correspond to the nozzle N2, combine into the pixel P2. Also, the pixels P31, P32, and P33 of FIG. 4, which correspond to the nozzle N3, combine into the pixel P3, and the pixels P41, P42, and P43 of FIG. 4, which correspond to the nozzle N4, combine into the pixel P4. The sum of ink filled in the pixels P11, P12, and P13 shown in FIG. 4 may be filled in the pixel P1 shown in FIG. 6. In this case, by measuring the thickness of an ink layer formed in the pixel P1, the thickness of the ink layer corresponding to the nozzle N1 can be obtained. The apparatus 200 shown in FIG. 6 can form pixel patterns more simply than in the previous embodiment, thereby reducing manufacturing cost.

According to the present invention as described above, the thickness of an ink layer filled in a pixel can be determined in a short amount of time in real-time by measuring the capacitance of the pixel. Also, the waveform of a voltage applied to each of nozzles is controlled based on the determined thickness of the ink layer, so that ink layers with the same thickness can be formed in pixels. For example, when the same pixel pattern as a pixel pattern of a color filter is formed in an apparatus for measuring the thickness of an ink layer according to the present invention, ink layers with a uniform thickness can be formed in pixels of the color filter. Furthermore, according to the present invention, after a pixel is filled with liquid ink, even if the thickness of an ink layer is varied due to evaporation of solvent, the thickness of the ink layer can be monitored in real-time. In other words, even if ink filled in the pixel is not dried, the thickness of the ink layer can be measured. Moreover, the above-described apparatus for measuring the thickness of an ink layer is reusable due to a cleaning process so as not to incur much cost.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. An apparatus for measuring a thickness of an ink layer, the apparatus comprising:

a substrate;

a plurality of pixels disposed on the substrate and filled with ink due to a printing operation;

first and second electrodes corresponding to each of the pixels, the first and second electrodes disposed on opposite sides of each of the pixels; and a capacitance measurement circuit electrically connected to the first and second electrodes to measure the capacitance of each of the pixels.

2. The apparatus of claim 1, wherein the printing operation is performed using an inkjet technique, and the pixels correspond respectively to nozzles of the inkjet head.

3. The apparatus of claim 1, wherein the thickness of an ink layer formed in each of the pixels is obtained by measuring the capacitance of the corresponding pixel.

4. The apparatus of claim 1, further comprising a material layer disposed on the substrate to define the pixels.

5. A method of measuring a thickness of an ink layer using an apparatus comprising a substrate, a plurality of pixels disposed on the substrate and filled with ink due to a printing operation, first and second electrodes corresponding to each of the pixels, the first and second electrodes disposed on opposite sides of each of the pixels, and a capacitance measurement circuit electrically connected to the first and second electrodes to measure the capacitance of each of the pixels, the method comprising:

measuring an initial capacitance of each of the pixels when the pixels are not filled with ink;

filling the pixels with the ink due to the printing operation;

measuring the capacitance of each of the pixels using the capacitance measurement circuit; and calculating the thickness of an ink layer filled in each of the pixels.

6. The method of claim 5, wherein the printing operation is performed using an inkjet technique.

7. The method of claim 5, wherein the calculating of the thickness of the ink layer is performed using a variation in the capacitance of the corresponding pixel, which is obtained by comparing the initial capacitance of the pixel with the capacitance of the pixel filled with the ink.

8. The method of claim 5, wherein the capacitance of the pixel filled with the ink is measured in real-time during the printing operation.

9. A method of controlling nozzles of an inkjet head using an apparatus comprising a substrate, a plurality of pixels disposed on the substrate and filled with ink due to a printing operation, first and second electrodes corresponding to each of the pixels, the first and second electrodes disposed on opposite sides of each of the pixels, and a capacitance measurement circuit electrically connected to the first and second electrodes to measure the capacitance of each of the pixels, wherein the printing operation is performed using an inkjet technique, and the pixels correspond respectively to nozzles of the inkjet head, the method comprising:

measuring an initial capacitance of each of the pixels when the pixels are not filled with the ink;

filing the pixels corresponding to the nozzles with the ink by applying voltages having preset waveforms to the respective nozzles of the inkjet head;

measuring the capacitances of the pixels using the capacitance measurement circuit;

calculating the thickness of an ink layer filled in each of the pixels; and setting waveforms of voltages corresponding to target thicknesses of ink layers to be formed in the nozzles of the inkjet head.

10. The method of claim 9, wherein the calculating of the thickness of the ink layer is performed using a variation in the capacitance of the corresponding pixel, which is obtained by comparing the initial capacitance of the pixel with the capacitance of the pixel filled with the ink.

11. The method of claim 9, after setting the waveforms of the voltages, the method further comprising repeating an operation of measuring the initial capacitance of each of the pixels through an operation of setting the waveforms of the voltages at least once.

* * * * *